(12) United States Patent
Tachibana

(10) Patent No.: US 10,668,514 B2
(45) Date of Patent: Jun. 2, 2020

(54) PLATE WIDTH CONTROL DEVICE FOR MATERIAL TO BE ROLLED

(71) Applicant: TOSHIBA MITSUBISHI-ELECTRIC INDUSTRIAL SYSTEMS CORPORATION, Chuo-ku (JP)

(72) Inventor: Minoru Tachibana, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 15/534,167

(22) PCT Filed: Mar. 10, 2015

(86) PCT No.: PCT/JP2015/056991
§ 371 (c)(1),
(2) Date: Jun. 8, 2017

(87) PCT Pub. No.: WO2016/143068
PCT Pub. Date: Sep. 15, 2016

(65) Prior Publication Data
US 2017/0341117 A1  Nov. 30, 2017

(51) Int. Cl.
*G05B 19/29* (2006.01)
*B21B 37/22* (2006.01)
(Continued)

(52) U.S. Cl.
CPC .............. *B21B 37/22* (2013.01); *G05B 19/29* (2013.01); *B21B 2265/12* (2013.01);
(Continued)

(58) Field of Classification Search
CPC . B21B 37/22; B21B 2275/12; B21B 2265/12; G05B 19/29; G05B 19/4163;
(Continued)

(56) References Cited

U.S. PATENT DOCUMENTS 3,630,055 A * 12/1971 Fapiano .................. B21B 37/28
72/10.4
3,798,940 A    3/1974 Frostick
(Continued)

FOREIGN PATENT DOCUMENTS

CN          101678417 A     3/2010
DE          197 44 504 A1   4/1999
(Continued)

OTHER PUBLICATIONS

English translation of the International Preliminary Report on Patentability and Written Opinion dated Sep. 21, 2017 in PCT/JP2015/056991.
(Continued)

*Primary Examiner* — Rocio Del Mar Perez-Velez
*Assistant Examiner* — Brian T McMenemy
(74) *Attorney, Agent, or Firm* — Xsensus LLP

(57) ABSTRACT

A plate width control device capable of improving the precision of the width of a material to be rolled is provided. In a rolling system, a plate width control device includes an arithmetic unit calculating an estimated value of a deviation amount of the width of the material to be rolled in the vertical rolling mill, and calculating an estimated value of an expansion amount of the width of the material to be rolled when a head end of the material to be rolled is caught in the horizontal rolling mill, and a control unit controlling a gap amount of the vertical rolling mill such that the deviation amount of the width of the material to be rolled is eliminated, and compensating for the gap amount of the vertical rolling mill when the head end of the material to be rolled is caught in the horizontal rolling mill.

4 Claims, 2 Drawing Sheets

(51) Int. Cl.
*B23H 9/00* (2006.01)
*G05B 19/416* (2006.01)

(52) U.S. Cl.
CPC ...... *B21B 2275/12* (2013.01); *G05B 19/4163* (2013.01); *G05B 2219/45201* (2013.01)

(58) Field of Classification Search
CPC ........... G05B 2219/45201; G05B 2219/37398; G05B 2219/43124
See application file for complete search history.

(56) References Cited

U.S. PATENT DOCUMENTS

| | | | | |
|---|---|---|---|---|
| 4,346,575 | A | * | 8/1982 | Shibahara ............... B21B 37/22 72/12.7 |
| 4,760,723 | A | | 8/1988 | Nakagawa |
| 6,227,021 | B1 | * | 5/2001 | Imanari .................. B21B 37/22 72/11.4 |
| 2003/0018416 | A1 | * | 1/2003 | Farina ................. A61M 15/009 700/283 |
| 2010/0121471 | A1 | * | 5/2010 | Higo ....................... B21B 37/58 700/104 |

FOREIGN PATENT DOCUMENTS

| | | | |
|---|---|---|---|
| EP | 2 823 901 A1 | | 1/2015 |
| JP | 57-130710 A | | 8/1982 |
| JP | 61-71118 A | | 4/1986 |
| JP | 61-232011 A | | 10/1986 |
| JP | 7-164028 A | | 6/1995 |
| JP | 8-300024 A | | 11/1996 |
| JP | H08-300024 A | * | 11/1996 |
| JP | 2002028709 A | * | 1/2002 |
| JP | 2003-205306 A | | 7/2003 |
| JP | 2009-279639 A | | 12/2009 |
| JP | 2010-527 A | | 1/2010 |
| WO | 2008/129634 A1 | | 10/2008 |

OTHER PUBLICATIONS

Japanese Office Action dated May 22, 2018, issued in Japanese Patent Application No. 2017-504483 (with English translation).
International Search Report dated May 26, 2015 in PCT/JP2015/056991 filed Mar. 10, 2015.
Taiwanese Office Action dated Aug. 11, 2016 in Taiwanese Patent Application No. 104119721 (with partial English translation) (6 pages).
Office Action dated Aug. 2, 2018 in Chinese Patent Application No. 201580074011.7 (with English language translation and English translation of categories of cited documents).
Office Action dated Aug. 27, 2018 in Korean Patent Application No. 10-2017-7021289 (with English language translation).
Office Action dated Jan. 28, 2019 in corresponding Korean Patent Application No. 10-2017-7021289 (with English Translation), 7 pages.
Office Action and Search Report dated Feb. 2, 2019 in the corresponding Chinese Patent Application No. 201580074011.7(with Unedited Computer-Generated English Translation of the Office Action and English Translation of Category of Cited Document) 14 pages.
Office Action dated Nov. 28, 2019 in corresponding Indian Patent Application No. 201717029397 with English Translation.

* cited by examiner

PLATE WIDTH CONTROL DEVICE FOR MATERIAL TO BE ROLLED

FIELD

The present invention relates to a plate width control device for a material to be rolled.

BACKGROUND

PTL 1 discloses a plate width control device of a material to be rolled. The plate width control device controls the gap amount of a vertical rolling mill so as to eliminate the deviation amount of the width of the material to be rolled, based on an estimated value of the deviation amount of the width of the material to be rolled in the vertical rolling mill.

CITATION LIST

Patent Literature

[PTL 1] JP 8-300024 A

SUMMARY

Technical Problem

However, the art described in PTL 1 does not correspond to expansion of the width of a material to be rolled, which is caused when the head end of the material to be rolled is caught in a horizontal rolling mill. Accordingly, when the head end of a material to be rolled is caught in a horizontal rolling mill, the material to be rolled is compressed between a vertical rolling mill and a horizontal rolling mill. Consequently, the width of the material to be rolled is expanded.

The present invention has been made to solve the above-described problem. An object of the present invention is to provide a plate width control device capable to improving the precision of the width of a material to be rolled.

Solution to Problem

A plate width control device for a material to be rolled according to the present invention, in a rolling system in which the material to be rolled is rolled in a width direction of the material to be rolled by a vertical rolling mill and the material to be rolled is rolled in a thickness direction of the material to be rolled by a horizontal rolling mill, includes an arithmetic unit that calculates an estimated value of a deviation amount of a width of the material to be rolled in the vertical rolling mill based on a deviation amount of a roll force applied to the material to be rolled by the vertical rolling mill, and calculates an estimated value of an expansion amount of the width of the material to be rolled when a head end of the material to be rolled is caught in the horizontal rolling mill, based on torque of the vertical rolling mill; and a control unit that controls a gap amount of the vertical rolling mill such that the deviation amount of the width of the material to be rolled is eliminated based on the estimated value of the deviation amount of the width of the material to be rolled in the vertical rolling mill, and compensates for the gap amount of the vertical rolling mill based on the estimated value of the expansion amount of the width of the material to be rolled when the head end of the material to be rolled is caught in the horizontal rolling mill.

A plate width control device for a material to be rolled according to the present invention, in a rolling system in which a material to be rolled is rolled in a width direction of the material to be rolled by a vertical rolling mill and the material to be rolled is rolled in a thickness direction of the material to be rolled by a horizontal rolling mill, includes an arithmetic unit that calculates an estimated value of a deviation amount of a width of the material to be rolled in the vertical rolling mill based on a deviation amount of a roll force applied to the material to be rolled by the vertical rolling mill, and calculates an estimated value of an expansion amount of the width of the material to be rolled when a head end of the material to be rolled is caught in the horizontal rolling mill, based a calculation model corresponding to the vertical rolling mill and the horizontal rolling mill; and a control unit that controls a gap amount of the vertical rolling mill such that the deviation amount of the width of the material to be rolled is eliminated based on the estimated value of the deviation amount of the width of the material to be rolled in the vertical rolling mill, and compensates for the gap amount of the vertical rolling mill based on the estimated value of the expansion amount of the width of the material to be rolled when the head end of the material to be rolled is caught in the horizontal rolling mill.

Advantageous Effects of Invention

According to the present invention, when the head end of the material to be rolled is caught in the horizontal rolling mill, the gap amount of the vertical rolling mill is compensated based on an estimated value of the expansion amount of the width of the material to be rolled. Accordingly, the precision of the width of the material to be rolled can be improved.

DESCRIPTION OF EMBODIMENTS

Figure 1:
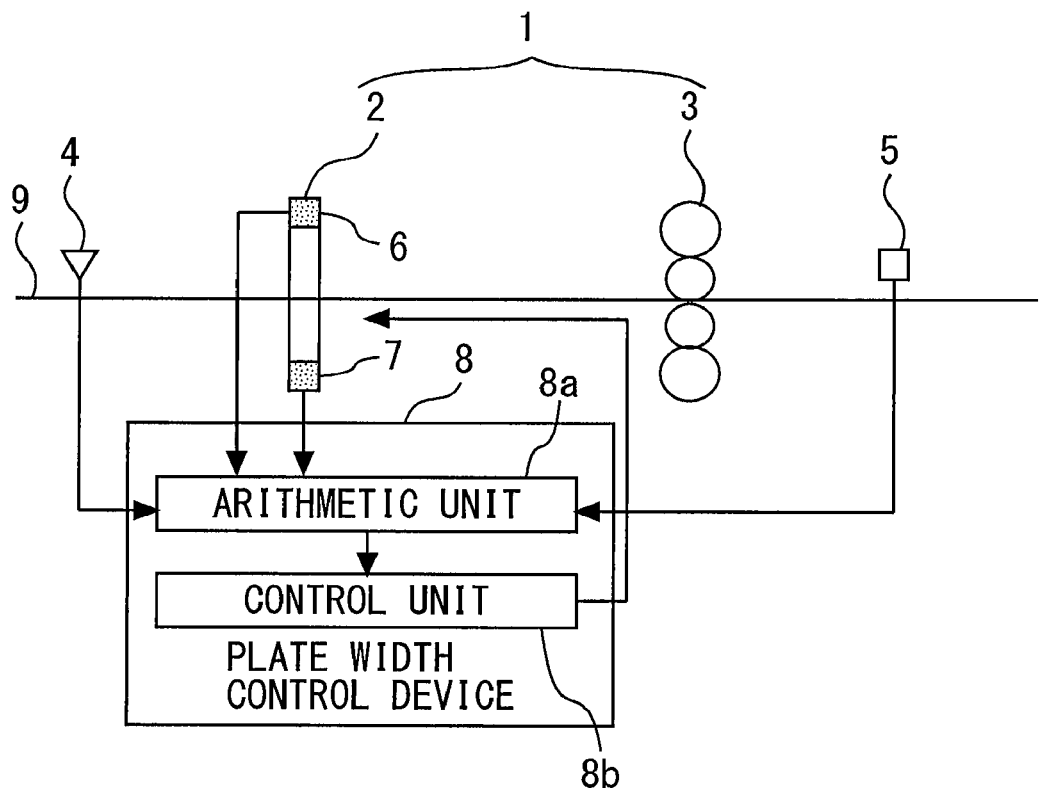
FIG. 1 is a configuration diagram of a rolling system to which a plate width control device for a material to be rolled according to an embodiment 1 of the present invention is applied.

An embodiment of the present invention will be described in accordance with the accompanying drawings. It should be noted that in the drawings, the same or corresponding parts are denoted by the same reference signs. Overlapping description of such parts will be simplified or omitted as appropriate.

Embodiment 1

FIG. 1 is a configuration diagram of a rolling system to which a plate width control device for a material to be rolled according to an embodiment 1 of the present invention is applied.

In a hot rolling system of FIG. 1, a roughing mill 1 includes a vertical rolling mill 2 and a horizontal rolling mill 3. The vertical rolling mill 2 is provided on the upstream side in the roughing mill 1. The horizontal rolling mill 3 is provided on the downstream side in the roughing mill 1.

A pyrometer 4 is provided upstream of the roughing mill 1. A width gauge meter 5 is provided downstream of the roughing mill 1. A drive device 6 is provided to the vertical rolling mill 2. A load cell 7 is provided to the vertical rolling mill 2.

A plate width control device 8 includes an arithmetic unit 8a and a control unit 8b. An input part of the arithmetic unit 8a is connected with an output part of the pyrometer 4, an output part of the width gauge meter 5, an output part of the drive device 6, and an output part of the load cell 7. An input part of the control unit 8b is connected with an output part of the arithmetic unit 8a. An output part of the control unit 8b is connected with an input part of an actuator (not shown) of the vertical rolling mill 2.

In the rolling system, a material to be rolled 9 is conveyed from the upstream side to the downstream side. The pyrometer 4 measures the temperature of the material to be rolled 9. The vertical rolling mill 2 rolls the material to be rolled 9 in the width direction of the material to be rolled 9. The load cell 7 measures a roll force applied to the material to be rolled.

In the arithmetic device, the arithmetic unit 8a calculates a change amount of the temperature of the material to be rolled 9 based on a measured value of the pyrometer 4. The arithmetic unit 8a calculates a deviation amount of a roll force applied to the material to be rolled 9 based on the measured value of the load cell 7. The arithmetic unit 8a calculates an estimated value of the deviation amount of the width of the material to be rolled 9, based on the change amount of the temperature of the material to be rolled 9 and the deviation amount of the roll force applied to the material to be rolled 9. The control unit 8b controls the gap amount of the vertical rolling mill 2 based on the estimated value of the deviation amount of the width of the material to be rolled 9 calculated by the arithmetic unit 8a.

When the head end of the material to be rolled 9 is caught in the horizontal rolling mill 3, the speed of the material to be rolled 9 is faster than the speed of the horizontal rolling mill 3. As a result, a failure in catching of the material to be rolled 9 in the horizontal rolling mill 3 is suppressed. For example, a slip of the material to be rolled 9 is suppressed.

At that time, in the arithmetic device, the arithmetic unit 8a calculates a torque value of the vertical rolling mill 2, based on the value obtained by feedback from the drive device 6. For example, the arithmetic unit 8a calculates a torque value of the vertical rolling mill 2 based on the electric current flowing through the drive device 6. The arithmetic unit 8a calculates an estimated value A (mm) of the expansion amount of the plate width of the material to be rolled 9 when the head end of the material to be rolled 9 is caught in the horizontal rolling mill 3, based on the torque value of the vertical rolling mill 2. For example, the estimated value A is calculated from Expression (1) provided below.

$$A = ET/EG/ER/(t \cdot w)/E \cdot v \cdot \{(M+Q)/M\} \cdot w \cdot G \quad (1)$$

Here, ET represents torque (N·m) of the vertical rolling mill 2. EG represents a gear ratio of the vertical rolling mill 2. ER represents a radius (m) of a roll of the vertical rolling mill 2. t represents a thickness (mm) of the material to be rolled 9. w represents a width (mm) of the material to be rolled 9. E represents a Young's modulus (N/mm$^2$) of the material to be rolled 9. v represents a Poisson's ratio of the material to be rolled 9. M represents a mill constant of the vertical rolling mill 2. Q represents a plasticity coefficient of the material to be rolled 9. G represents a gain.

The control unit 8b compensates for the gap amount of the vertical rolling mill 2 based on the estimated value A. Consequently, expansion of the width of the material to be rolled is suppressed.

Thereafter, the horizontal rolling mill 3 rolls the material to be rolled 9 in the thick direction of the material to be rolled 9. The width gauge meter 5 measures the width of the material to be rolled 9. The arithmetic unit 8a calculates a correction value of the deviation amount of the width of the material to be rolled 9, based on the measured value by the width gauge meter 5. The control unit 8b controls the gap amount of the vertical rolling mill 2 based on the estimated value and the correction value of the deviation amount of the width of the material to be rolled 9 calculated by the arithmetic unit 8a.

Figure 2:
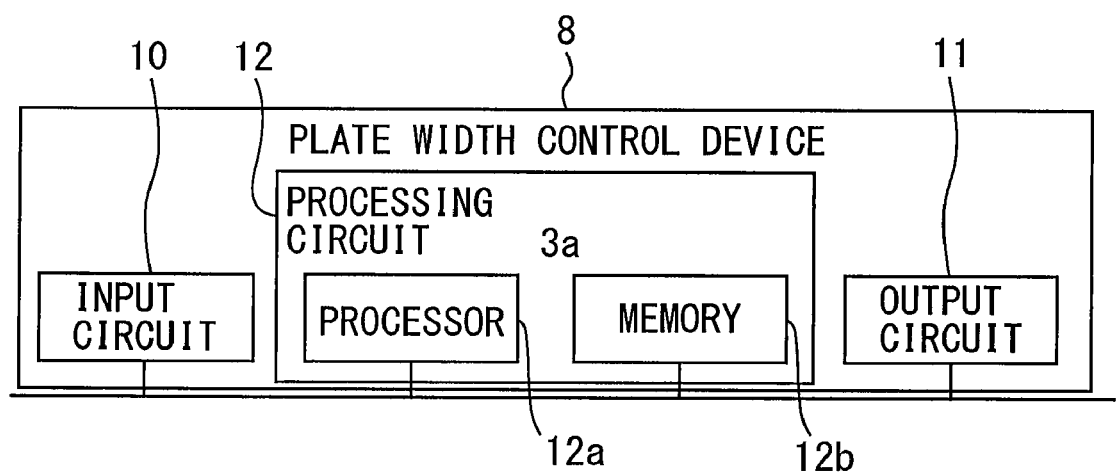
FIG. 2 is a hardware configuration diagram of the plate width control device for a material to be rolled according to the embodiment 1 of the present invention.

Next, an example of the plate width control device 8 will be described with use of FIG. 2. FIG. 2 is a hardware configuration diagram of a plate width control device for a material to be rolled in the embodiment 1 of the present invention.

As illustrated in FIG. 2, the plate width control device 8 includes an input circuit 10, an output circuit 11, and a processing circuit 12.

The input circuit 10 is connected with the output part of the pyrometer 4 (not shown in FIG. 2), the output part of the width gauge meter 5 (not shown in FIG. 2), the output part of the drive device 6 (not shown in FIG. 2), and the output part of the load cell 7 (not show in FIG. 2). The output circuit 11 is connected with the input part of the actuator of the vertical rolling mill 2 (not shown in FIG. 2).

The processing circuit 12 includes a processor 12a and a memory 12b. Calculation by the arithmetic unit 8a and control by the control unit 8b in FIG. 1 are realized by executing a program stored in at least one memory 12b by at least one processor 12a.

Figure 3:
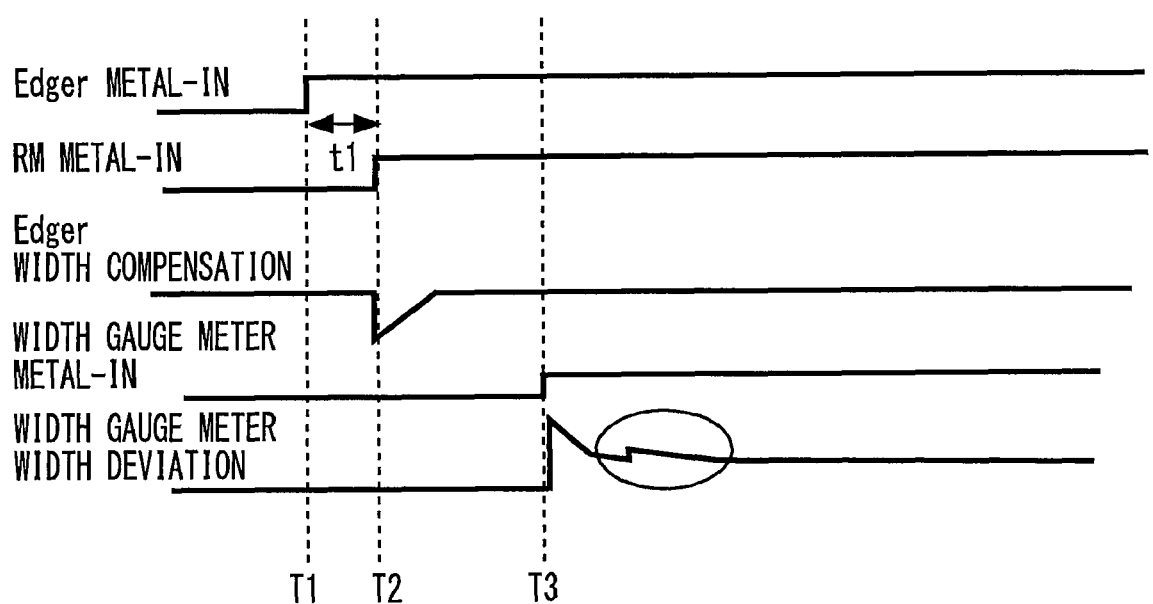
FIG. 3 is a timing chart for explaining control of the plate width of a material to be rolled by the plate width control device for the material to be rolled according to the embodiment 1 of the present invention.

Next, the timing of control by the plate width control device 8 will be described with use of FIG. 3. FIG. 3 is a timing chart for explaining control of the plate width of the material to be rolled by the plate width control device for the material to be rolled in the embodiment 1 of the present invention.

The uppermost stage in FIG. 3 is a chart for explaining the timing of starting rolling of the material to be rolled 9 by the vertical rolling mill 2. The second stage from the top in FIG. 3 is a chart for explaining the timing of starting rolling of the material to be rolled 9 by the horizontal rolling mill 3. The third stage from the top in FIG. 3 is a chart for explaining the timing of performing compensation of the width of the material to be rolled 9 by the plate width control device 8. The fourth stage from the top in FIG. 3 is a chart for explaining the timing of starting measurement of the width of the material to be rolled 9 by the width gauge meter 5. The lowermost stage in FIG. 3 is a chart for explaining the timing when the deviation of the width of the material to be rolled 9 measured by the width gauge meter 5 is changed.

As illustrated in FIG. 3, at a time T1, the vertical rolling mill 2 starts rolling of the material to be rolled 9. Then, when a period t1 passed, the time becomes a time T2. At that time, the horizontal rolling mill 3 starts rolling of the material to be rolled 9. As a result, the head end of the material to be rolled 9 is caught in the horizontal rolling mill 3.

The plate width control device 8 performs tracking on the head end of the material to be rolled 9 so as not to cause a delayed response of the gap amount of the vertical rolling mill 2. Based on the tracking result, when the time becomes T2, the plate width control device 8 performs fastening of the actuator of the vertical rolling mill 2 by the gap amount of the vertical rolling mill 2 corresponding to the estimated value A of the expansion amount of the plate width of the material to be rolled 9. Then, the plate width control device 8 outputs, to the actuator of the vertical rolling mill 2, a control command so as to allow the gap amount of the vertical rolling mill 2 to return to the original amount gradually.

Then, at a time T3, the width gauge meter 5 begins measurement of the width of the material to be rolled 9. At this time, the width deviation of the material to be rolled 9 is relatively large. Then, the width deviation of the material to be rolled 9 is stabilized rapidly.

According to the embodiment 1 described above, when the head end of the material to be rolled 9 is caught in the horizontal rolling mill 3, the gap amount of the vertical rolling mill 2 is compensated based on the estimated value of the expansion amount of the width of the material to be rolled 9. Accordingly it is possible to improve the precision of the width of the material to be rolled 9.

Further, the estimated value A of the expansion amount of the width of the material to be rolled 9 is calculated based on the torque value of the vertical rolling mill 2 obtained by feedback from the drive device 6 of the vertical rolling mill 2. Accordingly, it is possible to improve the precision of the width of the material to be rolled 9 without adding a special device.

It should be noted that it is also allowable to calculate an estimated value of the deviation amount of the width of the material to be rolled 9, without depending on the change amount of the temperature of the material to be rolled 9. Even in that case, it is possible to improve the precision of the width of the material to be rolled 9 to some extent.

Further, it is also acceptable to calculate an estimated value of the expansion amount of the width of the material to be rolled 9 when the head end of the material to be rolled 9 is caught in the horizontal rolling mill 3, based on a calculation model corresponding to the vertical rolling mill 2 and the horizontal rolling mill 3. For example, a relationship among the type of a material used as the material to be rolled 9, the thickness of the material to be rolled 9, the width of the material to be rolled 9, and the expansion amount of the material to be rolled 9 when caught in the horizontal rolling mill 3 may be obtained through an experiment using an actual hot rolling system. In that case, it is only necessary to calculate an estimated value of the expansion amount of the width of the material to be rolled 9 when the head end of the material to be rolled 9 is caught in the horizontal rolling mill 3 according to a calculation model based on the setting of the material, thickness, and width of the target material to be rolled 9. Even in that case, it is possible to improve the precision of the width of the material to be rolled 9.

INDUSTRIAL APPLICABILITY

As described above, the plate width control device for a material to be rolled according to the present invention is applicable to a system that improves the precision of the width of the material to be rolled.

REFERENCE SIGNS LIST

1 Roughing mill
2 Vertical rolling mill
3 Horizontal rolling mill
4 Pyrometer
5 Width gauge meter
6 Drive device
7 Load cell
8 Plate width control device
8a Arithmetic unit
8b Control unit
9 Material to be rolled
10 Input circuit
11 Output circuit
11 Processing circuit
12a Processor
12b Memory

The invention claimed is:

1. A plate width control device for a material to be rolled, in a rolling system in which a material to be rolled is rolled in a width direction of the material to be rolled by a vertical rolling mill and the material to be rolled is rolled in a thickness direction of the material to be rolled by a horizontal rolling mill, the plate width control device comprising processing circuitry configured to:
calculate an estimated value of a deviation amount of a width of the material to be rolled in the vertical rolling mill based on a deviation amount of a roll force applied to the material to be rolled by the vertical rolling mill, and calculate an estimated value of an expansion amount of the width of the material to be rolled at the time a head end of the material to be rolled is caught in the horizontal rolling mill, based on torque of the vertical rolling mill; and
control a gap amount of the vertical rolling mill such that the deviation amount of the width of the material to be rolled is eliminated based on the estimated value of the deviation amount of the width of the material to be rolled in the vertical rolling mill, and compensate for the gap amount of the vertical rolling mill based on the estimated value of the expansion amount of the width of the material to be rolled at the time the head end of the material to be rolled is caught in the horizontal rolling mill.

2. The plate width control device for the material to be rolled according to claim 1, wherein the processing circuitry is further configured to
calculate the estimated value of the expansion amount of the width of the material to be rolled at the time the head end of the material to be rolled is caught in the horizontal rolling mill, based on a value of the torque of the vertical rolling mill obtained by feedback from a drive device of the vertical rolling mill.

3. A plate width control device for a material to be rolled, in a rolling system in which a material to be rolled is rolled in a width direction of the material to be rolled by a vertical rolling mill and the material to be rolled is rolled in a thickness direction of the material to be rolled by a horizontal rolling mill, the plate width control device comprising processing circuitry configured to:
calculate an estimated value of a deviation amount of a width of the material to be rolled in the vertical rolling mill based on a deviation amount of a roll force applied to the material to be rolled by the vertical rolling mill, and calculate an estimated value of an expansion amount of the width of the material to be rolled at the time a head end of the material to be rolled is caught in the horizontal rolling mill, based on a calculation model corresponding to the vertical rolling mill and the horizontal rolling mill; and
control a gap amount of the vertical rolling mill such that the deviation amount of the width of the material to be rolled is eliminated based on the estimated value of the deviation amount of the width of the material to be rolled in the vertical rolling mill, and compensate for the gap amount of the vertical rolling mill based on the estimated value of the expansion amount of the width of the material to be rolled at the time the head end of the material to be rolled is caught in the horizontal rolling mill.

4. A plate width control device for a material to be rolled, in a rolling system in which a material to be rolled is rolled in a width direction of the material to be rolled by a vertical rolling mill and the material to be rolled is rolled in a thickness direction of the material to be rolled by a horizontal rolling mill, the plate width control device comprising processing circuitry configured to:

calculate an estimated value of a deviation amount of a width of the material to be rolled in the vertical rolling mill based on a deviation amount of a roll force applied to the material to be rolled by the vertical rolling mill, and calculate an estimated value of an expansion amount of the width of the material to be rolled at the time a head end of the material to be rolled is caught in the horizontal rolling mill, based on torque of the vertical rolling mill or based on a calculation model corresponding to the vertical rolling mill and the horizontal rolling mill, and control a gap amount of the vertical rolling mill such that the deviation amount of the width of the material to be rolled is eliminated based on the estimated value of the deviation amount of the width of the material to be rolled in the vertical rolling mill, and compensate for the gap amount of the vertical rolling mill based on the estimated value of the expansion amount of the width of the material to be rolled at the time the head end of the material to be rolled is caught in the horizontal rolling mill.

* * * * *